427-152 SR
1/28/86 XP 4,566,907

United States Patent [19]

Kagota

[11] Patent Number: 4,566,907

[45] Date of Patent: Jan. 28, 1986

[54] COLOR-DEVELOPING INK FOR NON-CARBON COPYING PAPER

[75] Inventor: Nobuhiro Kagota, Takasago, Japan

[73] Assignee: Mitsubishi Paper Mills, Ltd., Tokyo, Japan

[21] Appl. No.: 579,880

[22] Filed: Feb. 14, 1984

[51] Int. Cl.[4] .......... C09D 11/00

[52] U.S. Cl. .......... 106/21; 346/213; 427/150; 427/152

[58] Field of Search .......... 106/21; 282/27.5; 427/151, 152, 150, 146; 346/213

[56] References Cited

FOREIGN PATENT DOCUMENTS 51-80410 7/1976 Japan .

51-68307 12/1976 Japan .

OTHER PUBLICATIONS

Derwent Abstract, Accession No. 83-712516/29, Japanese Patent No. 558,217,566, Aug. 14, 1983.

*Primary Examiner*—Prince E. Willis

*Assistant Examiner*—Amelia B. Yarbrough

*Attorney, Agent, or Firm*—Cushman, Darby & Cushman

[57] ABSTRACT

A color-developing ink containing at least one color developer selected from the group consisting of phenolic resins, aromatic carboxylic acids and metal salts thereof as well as a higher chain ether having total carbon atoms of 10 to 40, has various advantages such as the density of the developed image is high, fading of the developed image with time is at a low level, blurring of the developed letters is also at a low level, there is no abnormal tinting by the developed image, there is no swell of rubber rolls of a printer, and printability on a printer is excellent.

5 Claims, No Drawings

COLOR-DEVELOPING INK FOR NON-CARBON COPYING PAPER

BACKGROUND OF THE INVENTION

1. Field of the Invention

This invention relates to a color-developing ink. More particularly, the present invention relates to a color-developing ink for non-carbon copying paper which ink gives an image by reacting with a colorless electron-donating dye precursor (hereinafter referred to as a color former).

2. Description of the Prior Art

Non-carbon copying papers consisting of a sheet of a color former and a sheet of an electron-accepting solid acid (hereinafter referred to as a color developer) and giving an image by utilizing the color development reaction between the color former and the color developer are already known and in wide use. As the color developer sheet, those on which an aqueous solution of a color developer is coated and dried on their entire surfaces are in general use, however, depending upon applications, those obtained by printing a color developer only on required parts of the surface of a plain paper or of the uncoated surface of a non-carbon upper paper (this printing is called spot printing) are in use. The color-developer-containing composition which is used for the above purpose is called a color-developing ink.

Most of the color-developing inks for spot printing currently in use are those for flexographic type or gravure type printing containing a low boiling organic solvent. Hence, these inks have had safety and hygienic problems associated with the organic solvent.

For solveing the above problems, Japanese Laid-open Patent Application Nos. 68307/1976, 80410/1976, 94308/1976, 89816/1979, 94910/1979, 148606/1979 and 38826/1980, etc. disclose color-developing inks for letter-press type or offset type printing not using any low boiling organic solvent. Future developments of these inks are expected.

Regrettably, these inks have the following drawbacks because the solvents used in the inks mainly for dissolving the color developers have no sufficient characteristics yet.

(1) The density of a developed image is not sufficient and its color fades with time.
(2) The developed image (letters) blurs.
(3) The rubber rolls of a printer swell.
(4) Staining by color development is caused by abnormal breaking of microcapsules coated on an upper paper.
(5) Transfer of an ink between rubber rolls for ink kneading is inferior at the time of printing.
(6) Scumming occurs in offset printing. Thus, color-developing ink satisfactory in all respects is not yet developed.

SUMMARY OF THE INVENTION

The object of the present invention is to provide a color-developing ink which can be used for letter-press type or offset type printing and which develops an image of high density, gives a low level of color fading with time, a low level of blurring of developed letters and no staining by abnormal color development, causes no swell of rubber rolls of a printer, and is excellent in printability on a printer.

As a result of extensive studies, the present inventor has thought of that the key for obtaining a good color-developing ink lies not only in its color developer but also in its solvent and consequently has found out that the above mentioned object can be attained by using, as a color developer, at least one member selected from the group consisting of phenolic resins, aromatic carboxylic acids and their metal salts and, as a solvent for said color developer, a higher chain ether having total carbon atoms of 10 to 40..

DETAILED DESCRIPTION OF THE INVENTION

The color developer used in the present invention is selected from the followings.

Phenolic resins

Novolak type phenolic resins having phenolic hydroxyl groups. Preferably, a p-phenylphenol-formaldehyde resin, a p-cumylphenol-formaldehyde resin, a p-sec- or p-tert-butylphenol-formaldehyde resin, a p-octylphenol-formaldehyde resin and their co-condensation products.

B. Aromatic carboxylic acids

Aromatic carboxylic acids having one carboxyl group per one aromatic ring, such as benzoic acid, 4-methyl-3-nitro-benzoic acid, p-tert-butylbenzoic acid, salicyclic acid, 1-hydroxy-2-naphthoic acid and their derivatives. Preferable examples are salicyclic acid derivatives such as 3,5-di-tert-butylsalicyclic acid, 3,5-di($\alpha$-methylbenzyl)salicyclic acid, 3-cyclohexyl-5-(2,2-dimethylbenzyl)salicyclic acid, 3-phenyl-5-(2,2-dimethylbenzyl)salicyclic acid and the like.

Metal salts of phenolic resins (A) and aromatic carboxylic acids (B)

Metals include, for example, calcium, magnesium, zinc, copper, iron, aluminum, nickel and the like. A particularly preferable metal is zinc.

As to the higher chain ether having total carbon atoms of 10 to 40 used in the color-developing ink of the present invention, two alkyl groups connected by an ether linkage may be same or different and straight chains or branched chains. Specific examples of the ether having two same alkyl groups include di-n-amyl ether, di-iso-amyl ether, di-n-octyl ether, di-2-ethylhexyl ether, bis(2-methyl-4-ethylamyl) ether, di-n-decyl ether, di-n-dodecyl ether (dilauryl ether), dimyristyl ether, dicetyl ether, etc. Specific examples of the ether having two different alkyl groups include lauryl methyl ether, lauryl ethyl ether, lauryl propyl ether, octyl lauryl ether, isoamyl cetyl ether, methyl stearyl ether, ethyl stearyl ether, propyl stearyl ether, etc. These ethers are used in the color-developing ink individually or as a mixture of two or more. All of the above ethers are dialkyl ethers.

When the ether has total carbon atoms less than 10, the resulting color-developing ink has an inferior stability at the time of printing. When the ether has total carbon atoms more than 40, its compatibility with the color developer is bad and further the resulting color-developing ink has a reduced fluidity.

Viewed from the fluidity and stability of the resulting color-developing ink and the solvency for the color developer, the most preferable higher chain ether has total carbon atoms of 13 to 24, a boiling point of about 200° C. or higher and a melting point of about 40° C. or lower.

Production of the color-developing ink of the present invention can be done by various methods. Accordingly, there is no restriction for the procedure for producing the ink.

In general, at least one color developer is dispersed and dissolved in at least one higher chain ether; a pigment, an adhesive and an additive are added as necessary; they are kneaded by the use of a three-roll mill; whereby a color-developing ink is produced.

At this time, the amount of the color developer used in the color-developing ink is 10 to 80% by weight, preferably 30 to 60% by weight relative to the latter.

The amount of the higher chain ether is 20 to 200% by weight, preferably 30 to 100% by weight relative to the color developer.

As the pigment, there are used inorganic pigments such as titanium oxide, zinc oxide, silicon oxide, calcium carbonate, magnesium carbonate, kaolin, talc, acid clay and the like as well as organic resius such as an urea-formaldehyde resin, a styrene resin and the like. They are used in the color-developing ink in an amount of 0 to 60% by weight relative to the latter.

As the adhesive, there are used a ketone resin, a maleic acid resin, a rosin-modified phenolic resin, nitrocellulose, an alkyd resin and the like.

As the additive, there are used an antioxidant, an ultraviolet light absorber, a fluorescent dye, an anti-offset agent (for example, starch, dextrin, various waxes) and the like.

The amount of the color-developing ink to be coated on papers by printing is 0.5 to 5 g/m$^2$, preferably 1 to 3 g/m$^2$.

The present invention will be explained specifically below by way of Examples, however, is in no way restricted to these Examples. In the Examples, parts refer to parts by weight.

EXAMPLE 1

To a molten mixture consisting of 50 parts of a p-phenylphenol-formaldehyde resin and 25 parts of bis(2-ethylhexyl) ether (boiling point 269° C., melting point—95° C.) was added 25 parts of titanium oxide. They were kneaded by the use of a three-roll mill to obtain an ink.

EXAMPLE 2

To a molten mixture consisting of 50 parts of a p-phenylphenol-formaldehyde resin and 20 parts of lauryl methyl ether (being a liquid at 20° C.) were added 20 parts of titanium oxide and 10 parts of calcium carbonate. They were kneaded by the use of a three-roll mill to obtain an ink.

EXAMPLE 3

To a molten mixture consisting of 50 parts of a zinc salt of a p-octylphenol-formaldehyde resin and 30 parts of di-n-lauryl ether (melting point 32° C.) were added 10 parts of zinc oxide and 10 parts of titanium oxide. They were kneaded by the use of a three-roll mill to obtain an ink.

EXAMPLE 4

To a molten mixture consisting of zinc 3,5-di-tert-butylsalicylate and 25 parts of bis(2-ethylhexyl) ether was added 25 parts of titanium oxide. They were kneaded by the use of a three-roll mill to obtain an ink.

COMPARATIVE EXAMPLE 1

The same procedure as in Example 1 was adopted except that bis(2-ethylhexyl) ether in Example 1 was replaced by lauryl caprylate, whereby an ink was obtained.

COMPARATIVE EXAMPLE 2

The same procedure as in Example 2 was adopted except that 20 parts of lauryl methyl ether in Example 2 was replaced by 30 parts of methylphenylxylylmethane (Hisol SAS manufactured by Nippon Petrochemicals Company Ltd.), whereby an ink was obtained.

PERFORMANCE COMPARISON TESTS

A part of a blanket used for offset printing was immersed for 24 hr in each of the inks obtained in Examples 1 to 4 and Comparative Examples 1 to 2, to examine the swell of the blanket.

Separately, each of the inks obtained in Examples 1 to 4 and Comparative Examples 1 to 2 was printed on a plain paper of 50 g/m$^2$ by the use of a letter-press printer so that the ink amount applied on the paper became 1.5 g/m$^2$, whereby a spot-printed CF (coated-front) paper was obtained. On the printed side of the spot-printed CF paper was superimposed an upper paper of non-carbon papers, and printing was conducted by the use of a typewriter. The density of the developed image right after printing was good in all inks. Fading of the developed image after one month as well as blurring of the developed letters after one month were examined.

The results were shown in Table 1.

TABLE 1

| | Swell of blanket | Color fading after one month | Blurring of developed letters after one month |
|---|---|---|---|
| Example 1 | O | O | O |
| Example 2 | O | O | O |
| Example 3 | O | O | O |
| Example 4 | O | O | O |
| Comparative Example 1 | Δ | X | X |
| Comparative Example 2 | X | O | Δ |

O Good.
Δ Has a slight problem in practical application.
X Can not be used practically.

What is claimed is:

1. A color-developing ink for non-carbon copying paper, characterized by containing at least one color developer selected from the group consisting of phenolic resins, aromatic carboxylic acids and metal salts thereof as well as a higher chain dialkyl ether having total carbon atoms of 10 to 40.

2. A color-developing ink according to claim 1, wherein the higher chain ether has total carbon atoms of 13 to 24.

3. A color-developing ink according to claim 1, wherein the higher chain ether has a boiling point of about 200° C. or higher and a melting point of about 40° C. or lower.

4. A color-developing ink according to claim 1, wherein the amount of the color developer is 10 to 80% by weight, preferably 30 to 60% by weight relative to the ink and the amount of the higher chain ether is 20 to 200% by weight, preferably 30 to 100% by weight relative to the color developer.

5. A color-developing ink according to claim 1 which further contains an inorganic pigment which is titanium oxide, zinc oxide, silicon oxide, calcium carbonate, magnesium carbonate, kaolin, talc, or acid clay and/or an organic resin which is an urea-formaldehyde resin or a styrene resin.

* * * * *